(12) United States Patent
Matthews, Jr.

(10) Patent No.: US 6,549,622 B1
(45) Date of Patent: Apr. 15, 2003

(54) SYSTEM AND METHOD FOR A FAST HARDWARE IMPLEMENTATION OF RC4

(75) Inventor: Donald P. Matthews, Jr., Campbell, CA (US)

(73) Assignee: Compaq Computer Corporation, Cupertino, CA (US)

( * ) Notice: Subject to any disclaimer, the term of this patent is extended or adjusted under 35 U.S.C. 154(b) by 0 days.

(21) Appl. No.: 09/199,033

(22) Filed: Nov. 23, 1998

(51) Int. Cl.[7] .............................. H04L 9/16; H04L 9/22; H04K 1/02
(52) U.S. Cl. .............................. 380/29; 380/28; 380/37; 380/42; 380/43; 380/44
(58) Field of Search .............................. 380/19, 28, 30, 380/285, 282, 43, 42, 29, 37, 262, 264

(56) References Cited

U.S. PATENT DOCUMENTS 5,717,760 A * 2/1998 Satterfield .................... 380/28
5,799,090 A * 8/1998 Angert ........................ 380/43
5,825,882 A * 10/1998 Kowalaski et al. .......... 380/25
6,125,182 A * 9/2000 Satterfield .................... 380/28

OTHER PUBLICATIONS

Bruce Schneier, "Applied Cryptography", Oct. 18, 1995, Wiley & Sons, 2nd addition, p. 397–398.*
Schneier, Bruce, *Applied Cryptography*, Second Edition, 1996, pp. 397, 398, New York, New York U.S.A.

* cited by examiner

Primary Examiner—Justin T. Darrow
(74) Attorney, Agent, or Firm—Fenwick & West LLP (57) ABSTRACT

The system and method of the present invention facilitates encrypting and decrypting files using a fast hardware implementation of the RC4 method to enable secure access to information resources in a computer network. The network system includes a sender computer coupled via a computer network to a receiver computer. The RC4 algorithm as implemented in hardware and its associated multiport memory (included within both the sender computer and the receiver computer) enables a fast hardware implementation of the respective encryption circuit and decryption circuit. Multi-port memory allows for at either computer site a fast hardware implementation of the RC4 encryption/decryption method where reads and writes are synchronously performed.

15 Claims, 10 Drawing Sheets

FIG. 5 (Example)

SYSTEM AND METHOD FOR A FAST HARDWARE IMPLEMENTATION OF RC4

TECHNICAL FIELD OF THE INVENTION

This invention relates generally to data security, and more particularly to a system and method for using a fast hardware implementation of RC4 to encrypt and decrypt files.

BACKGROUND OF THE INVENTION

In its infancy, computer networks provided a research-oriented environment where users and hosts were interested in a free and open exchange of information, and where users and hosts mutually trusted one another. However, computer networks have grown drastically. For example, the Internet currently interconnects at least 100,000 computer networks and millions of users. Because of the size and openness of many computer networks, computer networks have become a target of theft, data alteration, and other mischief.

Virtually everyone that sends information over many computer networks is vulnerable. Before sending a file over a computer network, companies balance the benefits and ease of transferring a file over the network against the risks of potential unauthorized file access. Companies generally use the security technique of encryption and decryption in an attempt to prevent unauthorized file access.

Many different types of encryption and decryption have been developed to prevent unauthorized file access. Bruce Schneier, author of *Applied Cryptography*, published by John Wiley & Sons, December 1995, describes RC4 as a variable-key-size stream cipher developed by RSA Data Security, Inc., of San Mateo, Calif., that is one example of a type of encryption/decryption method. RC4 is an encryption method that works in Output-Feedback (OFB) mode. The keystream RC4 is independent of the plaintext and the algorithm has an 8*8 S-box: $S_0, S_1, \ldots, S_{255}$.

The RC4 method for encrypting data is shown below in Table 1.

TABLE 1

RC4 Key Computation Algorithm (1) $i = (i + 1) \mod 256$
(2) $j = (j + S_i) \mod 256$
(3) swap $S_i$ and $S_j$
(4) $t = (S_i + S_j) \mod 256$
(5) $k = S_t$ As shown, two indices, i and j are generated to identify locations in a memory. Index j is based on a value, $S_i$, stored in the memory. The values $S_i$ and $S_j$, stored in the memory, are swapped, making the memory dynamic and ever-changing. A third index is then generated to identify a location based on the swapped values. The value stored at that location is used as the key. Because the memory is ever-changing, a hacker would need an exact replica of the memory and values stored therein at that exact moment in time to break the encryption/decryption code.

More particularly, in line 1 of the RC4 key computation algorithm, the variable "i" is incremented by 1. A modulo 256 is taken of the incremented value of variable "i". In line 2, "j" acquires the sum of "j" plus $S_i$. A modulo 256 is taken of the sum. In line 3, a swap of the memory addresses of $S_i$ and $S_j$ are taken. In line 4, "t" acquires the sum of the memory addresses of $S_i$ plus $S_j$, modulo 256. In line 5, key "k" acquires the value of $S_t$.

The entries of the RC4 encryption method are a permutation of the numbers "0" through "255". The permutation is a function of the variable-length key. The RC4 encryption method has two counters, "i" and "j" that are each initialized to zero. Variable "k" is XORed with the unencrypted message to produce the encrypted message or XORed with the encrypted message to produce the decrypted message. The S-box is filled linearly from $S_0, S_1, \ldots, S_{255}$. Once one 256 byte array is filled, another 256 byte array is filled with the key. This process of repeating the key as necessary continues until the entire array: $k_0, k_1, \ldots, k_{255}$ is filled.

A conventional implementation of the RC4 encryption/decryption method would include the steps shown in Table 2.

TABLE 2

RC4 Key Computation Software Implementation (1) increment i
(2) load $S_i$, add to j
(3) load $S_j$
(4) store value of $S_i$ into $S_j$
(5) store value of $S_j$ into $S_i$, add $S_i$
and $S_j$ to generate "t"
(6) load $S_t$, XOR $S_t$ with message The conventional implementation of the RC4 encryption/decryption method is generally performed in software. The steps shown in Table 2 repeat until all data is either encrypted or decrypted. As shown, in line 1 of the RC4 key computation software implementation, variable "i" is incremented by 1. Although not shown, a modulo 256 is taken of the incremented value of variable "i". In line 2, load the variable $S_i$ and add "j" to the variable $S_i$. Although not shown, a module 256 is taken of the sum. In line 3, load $S_j$. In line 4, perform one half of the swap of memory addresses by first storing $S_i$ into $S_j$. In line 5, complete the swap of memory addresses by storing $S_j$ into $S_i$, and add $S_i$ and $S_j$ to generate t. Although not shown a modulo of the sum is taken. In line 6, load $S_t$, and XOR $S_t$ with the message. Although a conventional software implementation of the RC4 encryption/decryption process eventually encrypts or decrypts a given message or file, this process is processor heavy, costly and requires excessive resource time.

Therefore, there is a need to provide a system and method to encrypt/decrypt files efficiently using a fast hardware implementation of the RC4 ciphertext algorithm.

SUMMARY OF THE INVENTION

The present invention provides a system and method for encrypting and decrypting files using a fast hardware implementation of the RC4 algorithm to enable secure access to information resources in a computer network. The network system includes a sender computer coupled via a computer network to a receiver computer.

Multiport memory included within both the sender computer and the receiver computer as part of the RC4 logic enable a fast hardware implementation of the respective encryption circuit and decryption circuit. The hardware implementation of the RC4 encryption/decryption algorithm is made faster by reducing the number of cycles needed to perform the encryption/decryption. One of ordinary skill in the art will understand that a reduction in the number of cycles greatly increases efficiency and reduces cost.

From a system point of view, a preferred embodiment of the invention encrypts a message using the RC4 encryption algorithm. The system comprises: a message receiver for receiving a message; a key computation module for computing an encryption key according to the RC4 encryption algorithm, where the key computation module includes at least one multiport memory that allows at least a synchronous read and write; and an XOR module for performing an XOR function of the message and the key to yield an encrypted message.

From a method point of view, a preferred embodiment of the invention encrypts a message using an encryption circuit that includes at least one multiport memory. The method comprises the steps of: (a) incrementing a value "i"; (b) loading a value $S_i$; (c) adding substantially simultaneously with step (b) a value $S_j$ of step b to a value "j"; (d) loading a value $S_j$; (e) adding substantially simultaneously with step (d) the value $S_j$ of step (d) to $S_i$ to generate "t" and storing $S_i$ into $S_j$; (f) reading k by loading $S_t$; (g) storing substantially simultaneously with step (f) $S_j$ into $S_i$ and incrementing the value "i"; and (h) performing an XOR function of the message and k (value $S_t$) to encrypt the message.

The invention may be better appreciated from the following Figures, taken together with the accompanying Detailed Description of the Invention.

DESCRIPTION OF THE PREFERRED EMBODIMENTS

The following describes the best presently contemplated mode of carrying out the invention. The description illustrates the general principles of the invention and is not to be considered limiting.

Figure 1:
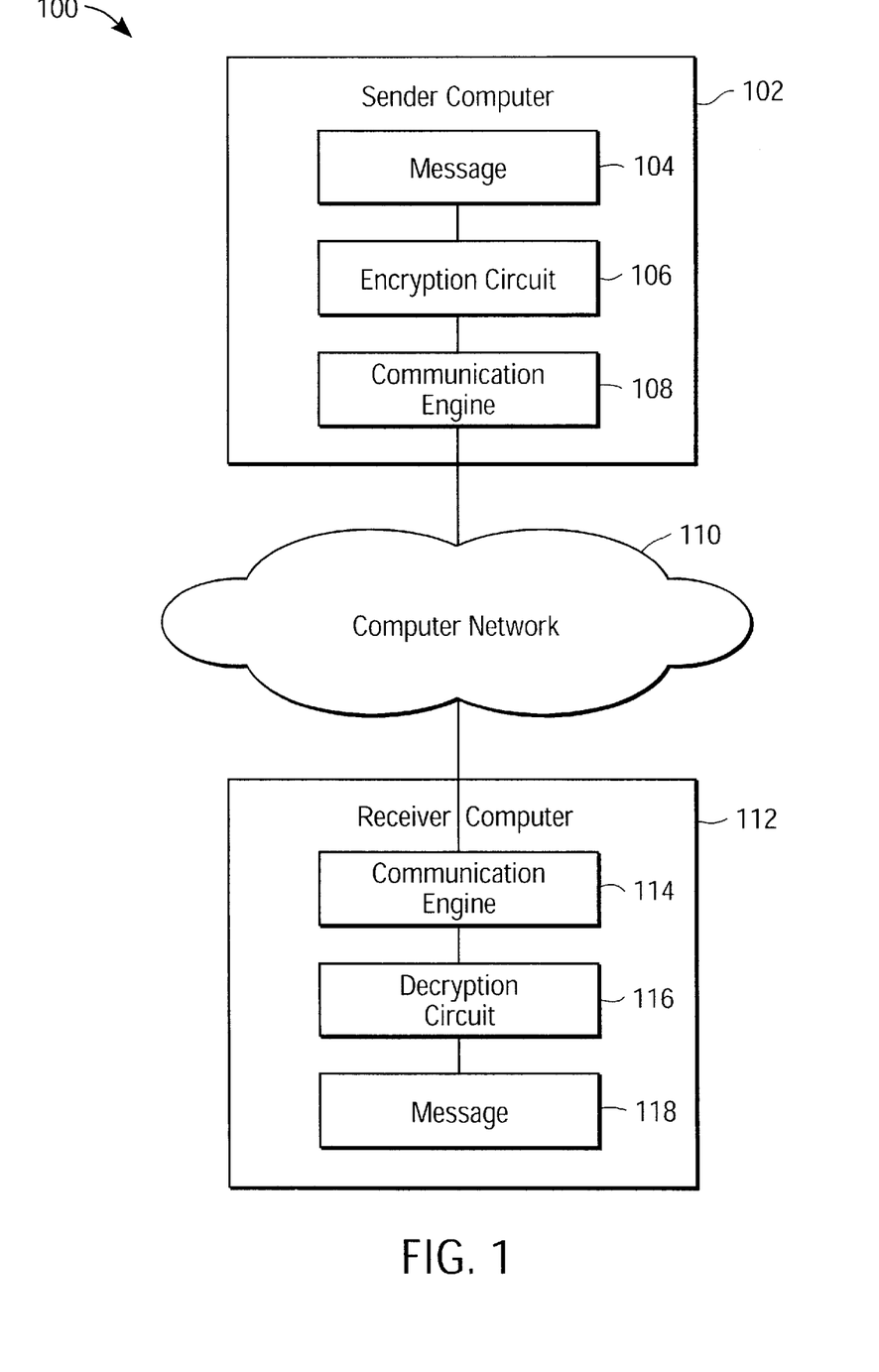
FIG. 1 is a block diagram illustrating a network system for encrypting and decrypting messages, in accordance with the present invention.

FIG. 1 is a block diagram illustrating an exemplary network system 100 for encrypting or decrypting files in accordance with the present invention. System 100 comprises a first node such as a sender computer 102 coupled via computer network 110 to a second node such as receiver computer 112. It will be appreciated that computer network 110 may be included within the wide area network commonly referred to as the Internet.

Sender computer 102 includes a message 104, an encryption circuit 106, and a communication engine 108. Communication engine 108 enables sender computer 102 to establish a communication link and send messages via computer network 110 to receiver computer 112. One of ordinary skill in the art will recognize that other techniques such as e-mail may be used to send message 104 across the computer network 110. One of ordinary skill in the art will also recognize that the term "message" is being used to include any amount of data, e.g., programs, e-mail, pictures, etc., that may be transmitted across computer network 110. It will be appreciated that encryption circuit 106 includes a fast hardware implementation of a modified version of the RC4 stream cipher for encrypting message 104.

Receiver computer 112 includes communication engine 114, a decryption circuit 116, and a message 118. Communication engine 114 enables receiver computer 112 to establish a communication link via computer network 110 with sender computer 102. It will be appreciated that receiver computer 112 may alternatively use an e-mail protocol to receive messages from sender computer 102. It will be appreciated that communication engine 114 may be a part of or include a web browser such as Netscape Navigator™ or the Internet Explorer™ by the Microsoft Corporation. It will be appreciated that the compatibility of communication engine 108 and communication engine 114 promotes communication links between sender computer 102 and receiver computer 112.

In a first example embodiment, for encrypting message 104, a dual port memory is used that supports a reduction in the number of cycle counts for performing the encryption or decryption algorithm from a 6 to 3 cycle core. As shown in Table 3 below, the modified RC4 encryption or decryption algorithm used with dual port memory includes four cycles with a 3 cycle core from cycle (2) to cycle (4). In comparison, Table 2 above shows a conventional implementation of RC4 that includes a six cycle core.

TABLE 3

Encryption/Decryption with a Single Dual Ported Memory

Cycle (1) increment i
(2) load $S_i$, add to j
(3) load $S_j$, add to $S_i$ to generate t, store value of $S_i$ into $S_j$
(4) load $S_t$ (reading k), store value of $S_j$ into $S_i$, increment i In a second example embodiment, a pair of dual port memories are used that support a reduction in the number of cycles counts for performing an encryption or decryption algorithm from a 6 to a 2 cycle core. As shown in Table 4, the modified RC4 encryption or decryption algorithm supported by a pair of dual port memories includes four cycles with a 2 cycle core from cycle (3) to cycle (4). In this embodiment the two write operations included within the cycles are input to both memories and the read operations are output from either memory.

TABLE 4

Encryption/Decryption with a Pair of Dual Ported Memories

Cycle (1) increment i
(2) load $S_i$, add to j
(3) load $S_j$, add to $S_i$ to generate "t", store value of $S_i$ into $S_j$, increment i
(4) load $S_t$ (reading k from second memory), TABLE 4-continued Encryption/Decryption with a Pair of Dual Ported Memories Cycle load S, add to j, store value of $S_j$ into $S_i$, old value of $S_j$ and $S_i$ locations A more detailed description of the application of the encryption and decryption cycles as shown in Tables 1–4 are provided below with regard to FIGS. 5–9 and the corresponding description of such FIGS.

Figure 2:
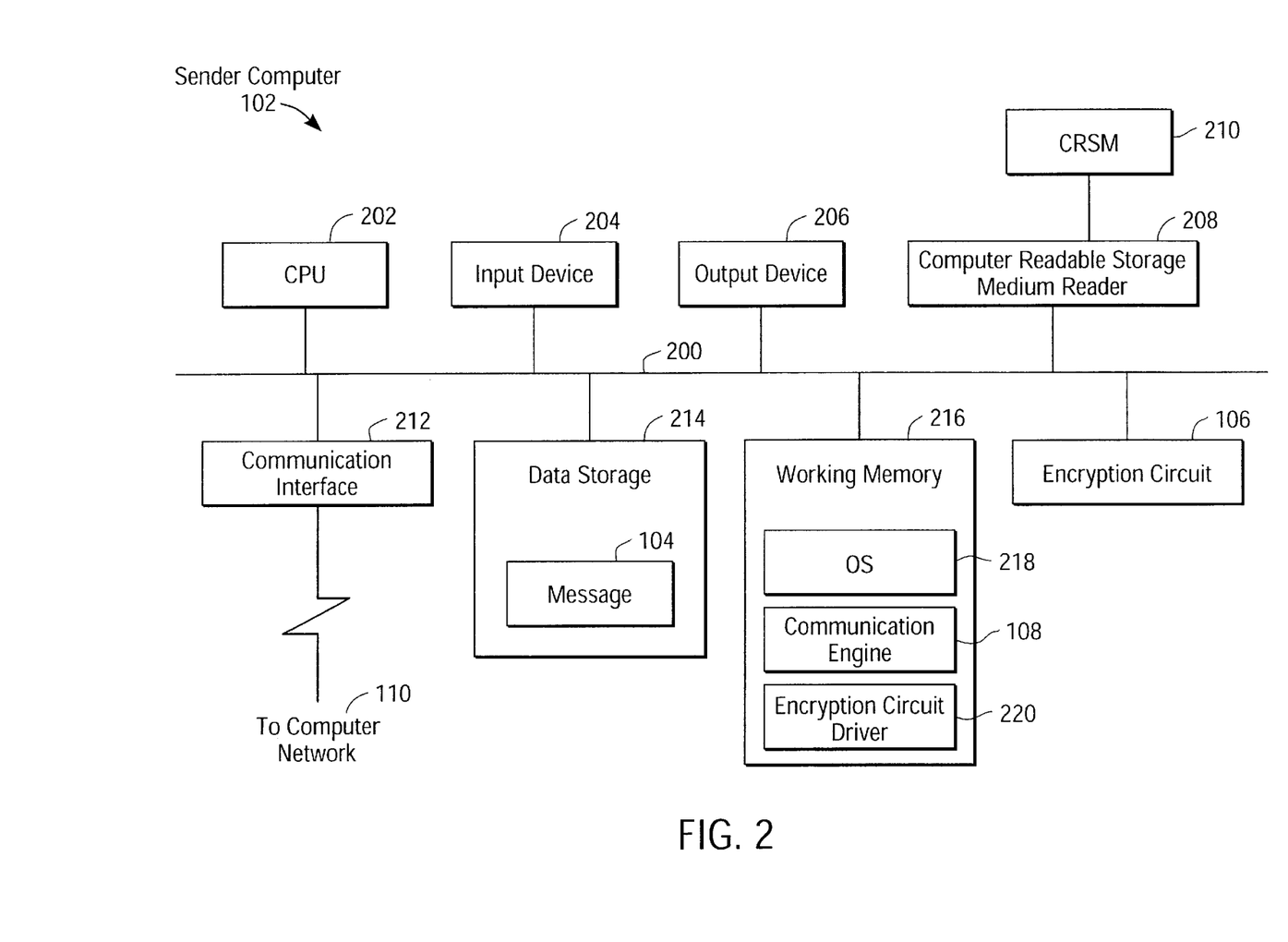
FIG. 2 is a block diagram illustrating details of an example sender computer of FIG. 1.

FIG. 2 is a block diagram illustrating details of sender computer 102. Sender computer 102 includes a Central Processing Unit (CPU) 202 such as a Motorola Power PC™ microprocessor or an Intel Pentium™ microprocessor. An input device 204 such as a keyboard or mouse, an output device 206 such as a Cathode Ray Tube (CRT) display, and a computer readable storage medium reader 208 such as a CD ROM drive are coupled via signal bus 200 to CPU 202. Computer readable storage medium reader 208 reads from a computer readable storage medium 210 such as a CD. A communications interface 212, a data storage device 214 such as Read Only Memory (ROM) or a magnetic disk, and working memory 216 such as Random-Access memory (RAM) are further coupled via signal bus 200 to CPU 202. As shown, message 104 is stored on data storage device 214. It will be appreciated that message 104 can also be stored in working memory 216. Sender computer 102 further includes a communications interface 212 coupled to computer network 110 as shown in and described with reference to FIG. 1.

Working memory 216 stores communication engine 108 for generating and transferring message packets such as requests to and from computer network 110 via communication interface 212. Working memory 216 further stores encryption circuit driver 220 for controlling encryption circuit 106 of sender computer 102. Operating System 218 executes programs and performs basic tasks such as recognizing input from the keyboard, sending output to the display screen, keeping track of files and directories on the disk, and controlling peripheral devices such as disk drives and printers. One of ordinary skill in the art will understand that if computer network 110 is the Internet, sender computer 102 may include an internet engine such as a web browser, e.g., the Navigator web browser produced by the Netscape Corporation or the Internet Explorer™ web browser produced by the Microsoft Corporation.

Sender computer 102 further includes encryption circuit 106 coupled to bus 200 for performing a fast RC4 encryption of message 104. Although encryption circuit 106 is shown coupled to bus 200 it will be appreciated that encryption circuit 106 may also be coupled to or part of communication interface 212, input device 204, output device 206, or other component within sender computer 102. One of ordinary skill in the art will understand that the encryption circuit 106 may be external to sender computer 102.

Figure 3:
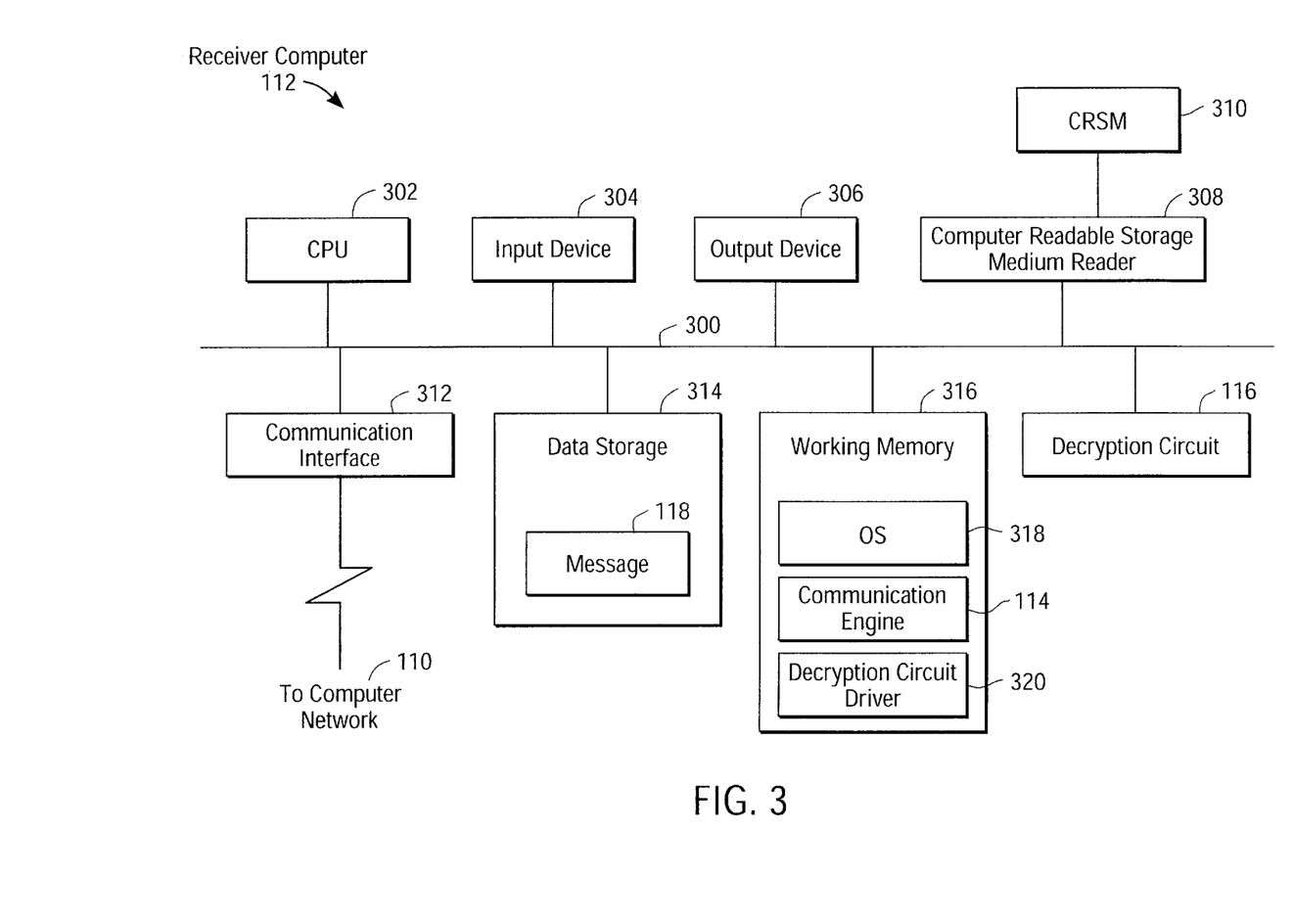
FIG. 3 is a block diagram illustrating details of an example receiver computer of FIG. 1.

FIG. 3 is a block diagram illustrating details of receiver computer 112. Receiver computer 112 includes CPU 302 such as a Motorola Power PC™ microprocessor or an Intel Pentium™ microprocessor. An Input device 304 such as a keyboard and mouse, an output device 306 such as a CRT display, and a computer readable storage medium reader 308 such as a CD ROM drive are coupled via signal bus 300 to CPU 302. Computer readable storage medium reader 308 reads from a computer readable storage medium 310, such as a CD. A communications interface 312, a data storage device 314 such as ROM or a magnetic disk, and working memory 316 such as RAM are further coupled via signal bus 300 to CPU 302. As shown, message 118 is stored on data storage device 314. Receiver computer 102 further includes a communications interface 312 coupled to computer network 110 as shown in and described with reference to FIG. 1.

Working memory 316 stores communication engine 114 for generating and transferring message packets such as message 118 to and from computer network 110 via communication interface 312. Working memory 316 further stores decryption circuit driver 320 for controlling decryption circuit 116 of receiver computer 112. Operating System 318 executes programs and performs basic tasks such as recognizing input from the keyboard, sending output to the display screen, keeping track of files and directories on the disk, and controlling peripheral devices such as disk drives and printers. One of ordinary skill in the art will understand that if computer network 110 is the Internet, receiver computer 112 may include an internet engine such as a web browser, e.g., the Navigator web browser produced by the Netscape Corporation or the Internet Explorer™ web browser produced by the Microsoft Corporation.

Receiver computer 112 further includes decryption circuit 116 coupled to bus 300 for performing a fast RC4 decryption of encrypted message 104. Although decryption circuit 116 is shown coupled to bus 300 it will be appreciated that decryption circuit 116 may also be coupled to or part of communication interface 312, input device 304, output device 306, or other components within sender computer 102. One of ordinary skill in the art will understand that the decryption circuit 116 may be external to receiver computer 112.

Figure 4:
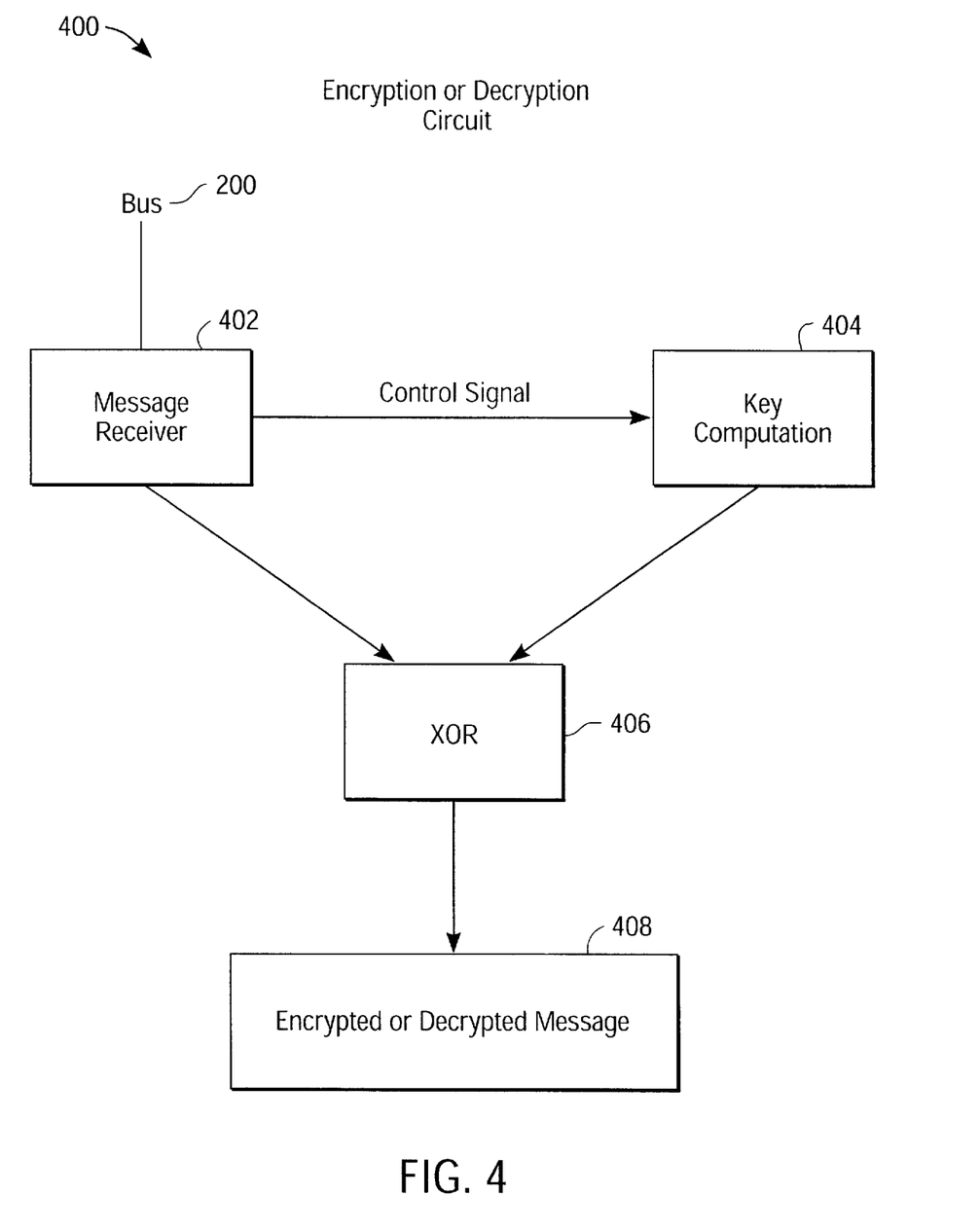
FIG. 4 is a block diagram of the encryption or decryption circuit of FIG. 1.

FIG. 4 is a flowchart illustrating a system 400 for encrypting or decrypting a message. System 400 includes a message receiver 402 coupled to bus 200, a key computation module 404 electrically coupled to message receiver 402, and an XOR module 406 electrically coupled to message receiver 402 and key computation module 404. It will be appreciated that message receiver 402 may be coupled to bus 300. System 400 yields an encrypted or decrypted message 408. More particularly, the message receiver 402 of sender computer 102 receives an unencrypted message 104 via bus 200 from communication engine 108 or encryption circuit driver 220. Message receiver 402 sends a trigger such as a control signal to key computation module 404. Key computation module 404 computes the key according to the RC4 encryption algorithm (see Tables 3 and 4). Key computation module 404 is described in greater detail with reference to FIGS. 6, 7, 8A, 8B and 9.

Once the key is computed, XOR module 406 performs an XOR operation of the key and message 104, thereby yielding an encrypted message 408.

Similarly, if message receiver 402 receives an encrypted message 104, the same application as described above for system 400 yields a decrypted message 408. More particularly, the message receiver 402 of receiver computer 112 receives an encrypted message 104 via bus 300 from communication engine 114 or decryption circuit driver 320. Message receiver 402 sends a trigger such as a control signal to key computation module 404. Key computation module 404 computes the key according to the RC4 encryption algorithm (see Tables 3 and 4). Once the key is computed, XOR module 406 performs an XOR operation of the key and message 104, thereby yielding a decrypted message 408.

Figure 5:
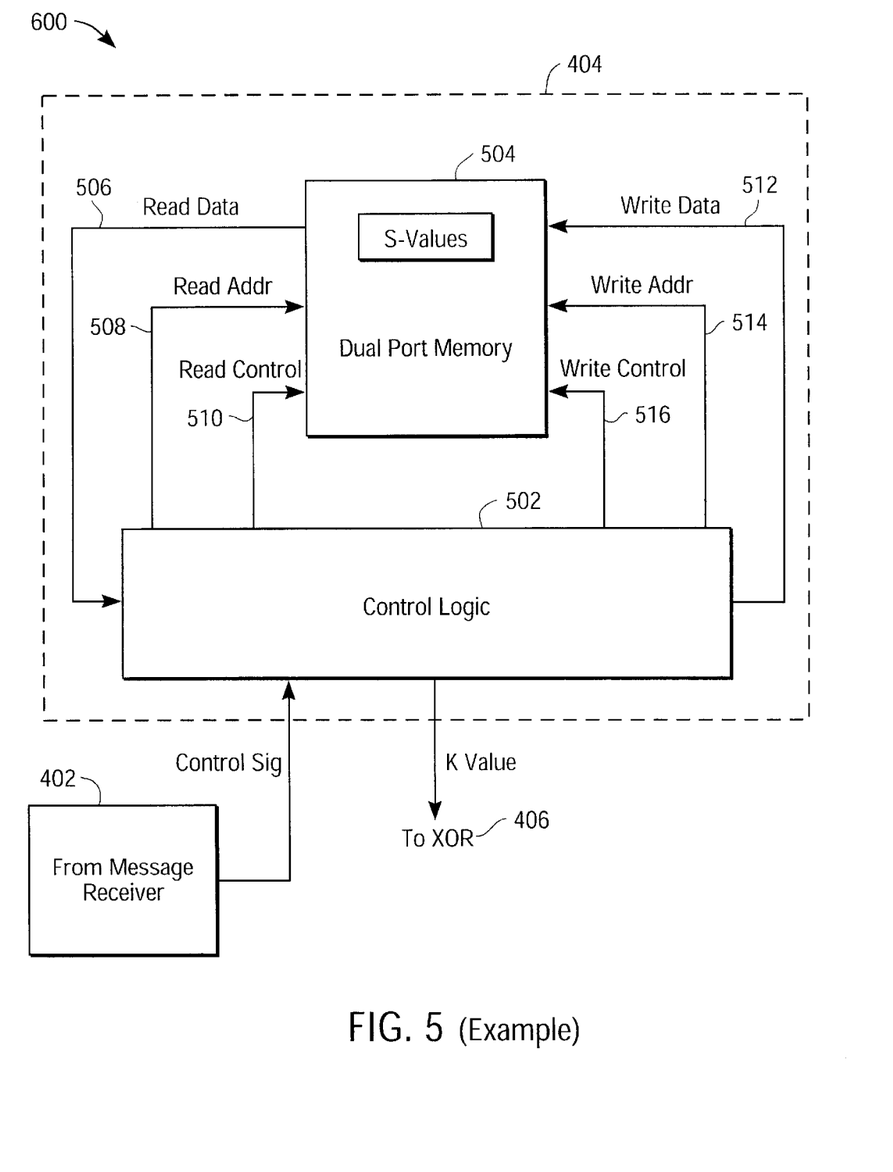
FIG. 5 is a block diagram illustrating the interface between a dual port memory and the encryption circuit in accordance with the present invention.

FIG. 5 is a block diagram illustrating details of the key computation module 404 where one dual port memory 504 is included. Key computation module 404 includes dual port memory 504 electrically coupled to control logic 502. Control logic 502 receives a trigger such as a control signal from message receiver 402 which requests the computation of a key value. Control logic 502 executes and applies the RC4 encryption algorithm by retrieving from and writing the s values to the s-values of dual port memory 504. The control logic 502 is coupled to dual port memory 504 via read data bus 506, read addr bus 508, read control bus 510, write data bus 512, write addr bus 514, and write control bus 516. Control logic 502 outputs the key to XOR module 406. It will be appreciated that the same key computation module 404 is applicable to both sender computer 102 for message encryption and to receiver computer 112 for message decryption.

It will be appreciated that dual port memory 504 allows for a simultaneous read and write. One of ordinary skill in the art will understand that simultaneous reads and writes support a reduction in the number of cycles for performing the RC4 algorithm. Therefore, as shown in Table 3, it is possible to perform a "load", "add", and "store" in the same cycle.

Figure 6:
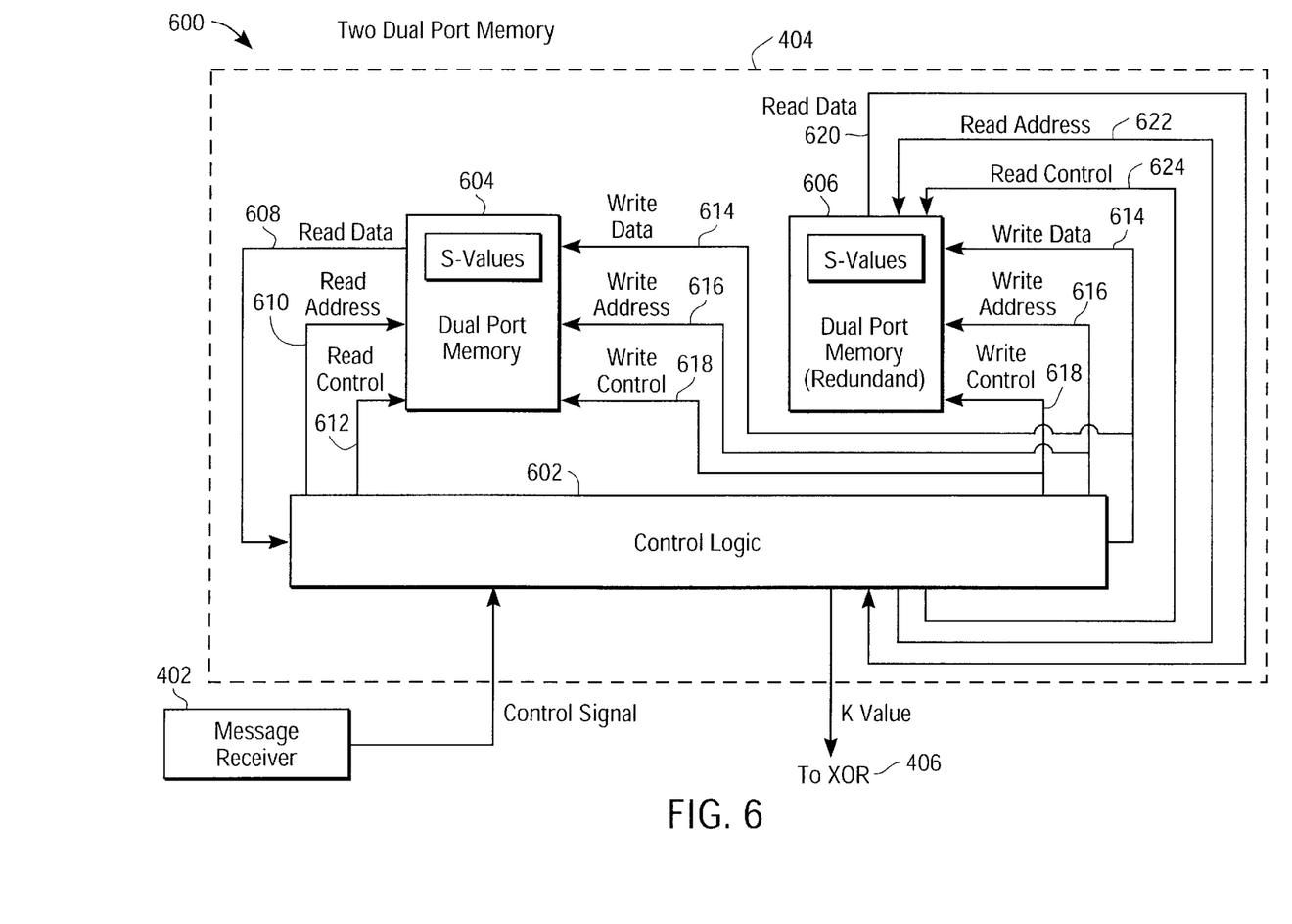
FIG. 6 is a block diagram illustrating the interface between a pair of dual port memories and the encryption or decryption circuit in accordance with the present invention.

FIG. 6 is a block diagram illustrating details of the key computation module 404 where two dual port memories 604 and 606 are included. The control logic 602 receives a trigger such as a control signal from message receiver 402 that requests the computation of a key. Control logic 602 executes and applies the RC4 encryption algorithm using the two dual port memories 604 and 606. The control logic 602 is coupled to the first dual port memory 604 via read data bus 608, read addr bus 610, read control bus 612, write data bus 614, write addr bus 616 and write control bus 618. The control logic 602 is coupled to the second dual port memory 606 via read data bus 620, read addr bus 622, read control bus 624, write data bus 614, write addr bus 616 and write control bus 618. Control logic 602 outputs the key to XOR module 406. It will be appreciated that the write operation will be performed simultaneously on dual port memories 604 and 606. It will further be appreciated that the same key computation module 404 is applicable to both sender computer 102 for encryption and to receiver computer 112 for decryption.

It will be appreciated that two dual port memories, dual port memory 604 and dual port memory 606, allow for simultaneous reads and writes. One of ordinary skill in the art will understand that simultaneous reads and writes support a reduction in the number of cycles for performing the RC4 algorithm. Therefore, as shown in table 4, it is possible to perform two "load" operations, an "add" operation and a "store" operation in the same cycle.

Included below is a software program example written in the Verilog programming language that simulates the fast hardware implementation of the RC4 encryption/decryption algorithm of the present invention. One of ordinary skill in the art will understand that the included program written in the programming language Verilog to simulate the present invention may be written in other programming languages.

TABLE 5

Verilog Simulation of Fast Hardware Implementation of RC4

```
timescale 1ns/100 ps
/* This module assumes that the memory is external to this block. With
the
memory block added at the end of this file, the interface does not need
all of the
memory interface signals. It is left commented so that it is easy to change
back to
an external memory design later
module rc4_run(busy, data_out data_ready, i_out,j_out, write_adr,
write_data, write_enable, read_addr, read_enable, read_data,
i_in, j_in, request, number_bytes, global_reset_, clk):
*/
module rc4_run(busy, data_out, data_ready, i_out, j_out,
i_in, j_in, request,
number_bytes, global_reset_, clk);
// This module pulls together all of the parts of the rc4 algorithm for
// runtime operation.
// i_out and j_out: are used for continuing a cipher
// i_in and j_in are also used for continuing a cipher
/* The port lists needs to be changed to support the internal memory
the external memory port list is left here for future use
Also, change the wire lists.
output [7:0] data_out, i_out, j_out, write_data, write_addr, read_addr;
output busy, data_ready, write_enable, read_enable;
input [15:0] number_bytes;
input [7:0] i_in, j_in, read_data;
input request, global_reset_, clk;
wire [15:0] count, counter;
wire [4:0] state;
*/
output [7:0] data_out, i_out, j_out;
output busy, data_ready;
input [15:0] number_bytes;
input [7:0] i_in, j_in;
input request, global_reset_, clk;
wire [15:0] count, counter;
wire [4:0] state;
wire [7:0] read_addr, write_addr, write_data, read_data;
assign count = number_bytes;
rc4_state_machine SM(busy, state, request, count, counter,
global_reset_, clk)
;
rc4_algorithm RC4alg(data_out,
data_ready, i_out, j_out, counter, read_addr,
write_addr, write_data, read_enable, write_enable,
_in, j_in, state, read_data, global_reset_, clk);
// Add a memory block for testing.
This would not be the synthesized memory
memory mem_1 (read_data, read_addr,
write_addr, write_data, read_enable,
write_enable, clk);
endmodule
*/
module rc4_state_machine(busy, state, request,
count, counter, global_reset_
clk);
// This module is the six state state machine that represents the basic
// process of the RC4 algorithm.
/*
*/
output busy;
output [4:0] state;
input request, global_reset_, clk;
input [15:0] count, counter;
reg [4:0] state next_state;
reg busy;
parameter STATE_IDLE = 'b00001,
STATE_LOAD = 'b00010,
STATE_ADD_J = 'b00100,
STATE_CALC_T = 'b01000,
STATE_SWAP = 'b10000;
always @ (posedge clk or negedge global_reset_)
begin
    if (~global_reset_)
        state <= STATE_IDLE;
    else
        state <= next_state;
```

TABLE 5-continued

Verilog Simulation of Fast Hardware Implementation of RC4

```
end
always @ (request or state or count or counter)
begin
    busy = 1'b1;
    next_state = STATE_IDLE;
    case (state)
        STATE_IDLE : begin
            busy = 1'b0,
            if (request)
                begin
                    next_state = STATE_LOAD;
                end
            else
                begin
                    next_state = STATE_IDLE
                end
        STATE_LOAD: begin
            next_state = STATE_ADD_J;
            end
        STATE_ADD_J: begin
            next_state = STATE_CALC_T;
            end
        STATE_CALC_T: begin
            next_state = STATE_SWAP;
            end
        STATE_SWAP: begin
            if (count == counter)
                next_state = STATE_IDLE
            else
                next_state = STATE_ADD_J;
            end
        default: begin
            next_STATE_IDLE;
            busy = 1'b1;
            end
    endcase
end
endmodule
module rc4_algorithm (k, k_done, i_out,
    j_out, counter, read_adddr, write_addr,
    write_data, read_enable, write_enable, i_in, j_in,
    state, read_data, global_reset_,clk);
// This module performs the RC4 algorithm.
This is a simple and straight
forward algorithm.
    output [15:0] counter;
    output [7:0] k,i_out, j_out, read_addr, write_addr, write_data;
    output k_done, write_enable, read_enable;
    input [7:0] i_in, j_in, read_data;
    input [4:0] state;
    input global_reset_, clk;
    wire [15:0] incrementor_out;
    wire [7:0] adder_out;
    wire state_idle, state_load, state_add_j, state_calc_t, state_swap;
    reg [15:0] counter, incrementor_in;
    reg [7:0] i, j, k, S_temp, t, adder_in,
        read_addr, write_addr, write_data;
    reg write_enable, read_enable, k_done;
assign state_idle = state [0];
assign state_load = state [1];
assign state_add_j = state [2];
assign state_calc_t = state [3];
assign state_swap = state [4];
assign i_out = i;
assign j_out = j;
                                                            Reference
assign incrementor_out = incrementor_in + 16'b1;    802
assign adder_out = adder_in + read_data             804
always @ (posedge clk or negedge global_reset_)
begin                                               806
    if (~global_reset_)
        counter <= 16'b0;
    else
        if(state_load)
            counter <= 16'b0;
        else
            if (state_calc_t)
                counter <= incrementor_out;
end
always @ (posedge clk or negedge global_reset_)
begin                                               808
    if (~global_reset_)
        i <= 8'b0;
    else
        if (state_load)
            i <= i_in;
        else
            if (state_swap)
                i <= incrementor_out [7:0];
end
always @ (posedge clk or negedge global_reset_)
begin                                               810
    if (~global_reset_)
        j <= 8'b0;
    else
        if (state_load)
            <= j_in;
        else:
            if (state_add_j)
                j <= adder_out;
end
always @ (posedge clk or negedge global_reset_)
begin                                               812
    if (global_reset_)
        t <= 8'b0;
    else
        if (state_calc_t)
            t <= adder-out;
end
always @ (i or counter or state_load or state_swap)
begin                                               814
    if (state_swap)
        incrementor_in = {8'b0,i};
    else
        incrementor_in = counter;
end
always @ (state_add_j or j or S_temp)
begin                                               816
    if (state_add_j)
        adder_in = j;
    else
        adder_in = S_temp;
end
alays @ (posedge clk or negedge global_reset_j)
begin                                               818
    if (~global_reset_)
        begin
            k <= 8'b0;
            k_done <= 1'b0;
        end
    else
        if (state_swap)
            begin
                if(t == i)
                    k <= S_temp; // Might be able to eliminate the
K register
                else // and use S_temp in its place
saving 8 FFs
                    k <= read_data;
                    k_done <= 1'b1;
            end
        else
            k_done <= 1'b0;
end
always @ (posedge clk or negedge global_reset_)
begin
    if (~global_reset_)                             820
        S_temp <= 8'b0;
    else
    if (state_add_j || state_calc_t)
        S_temp <= read_data;
    // only needed in state_add_j and state_calc_t
end
always @ (state)
```

TABLE 5-continued

Verilog Simulation of Fast Hardware Implementation of RC4

```
begin
      read_addr = 8'b0;                          850
      write_addr = 8'b0;                         852
      write_data = 8'b0;854
      read_enable = 1'b0;                        870
      write_enable = 1'b0;                       880
      case (state)
      5'b00100: begin // state_add_j
            read_addr = i                        822
            read_enable = 1'b1;                  824
            end
      5'b01000: begin //state_calc_t
            read_addr = j;                       826
            read_enable-1'b1                     828
            write_addr = j;                      830
            write_enable = 1'b1                  832
            write_data = S_temp;                 834
            end
      5'b10000: begin // state_swap
            read_addr = t;                       836
            read_enable = 1'b1;                  838
            write_addr = i;                      840
            write_enable = 1'b1;                 842
            write_data = S_temp;                 834
            end
      default: begin
            read_addr = 8'b0;
            write_addr = 8'b0;
            write_data = 8'b0;
            read_enable = 1'b0;
            write_enable = 1'b0;
            end
      endcase
end
endmodule
```

Figure 7:
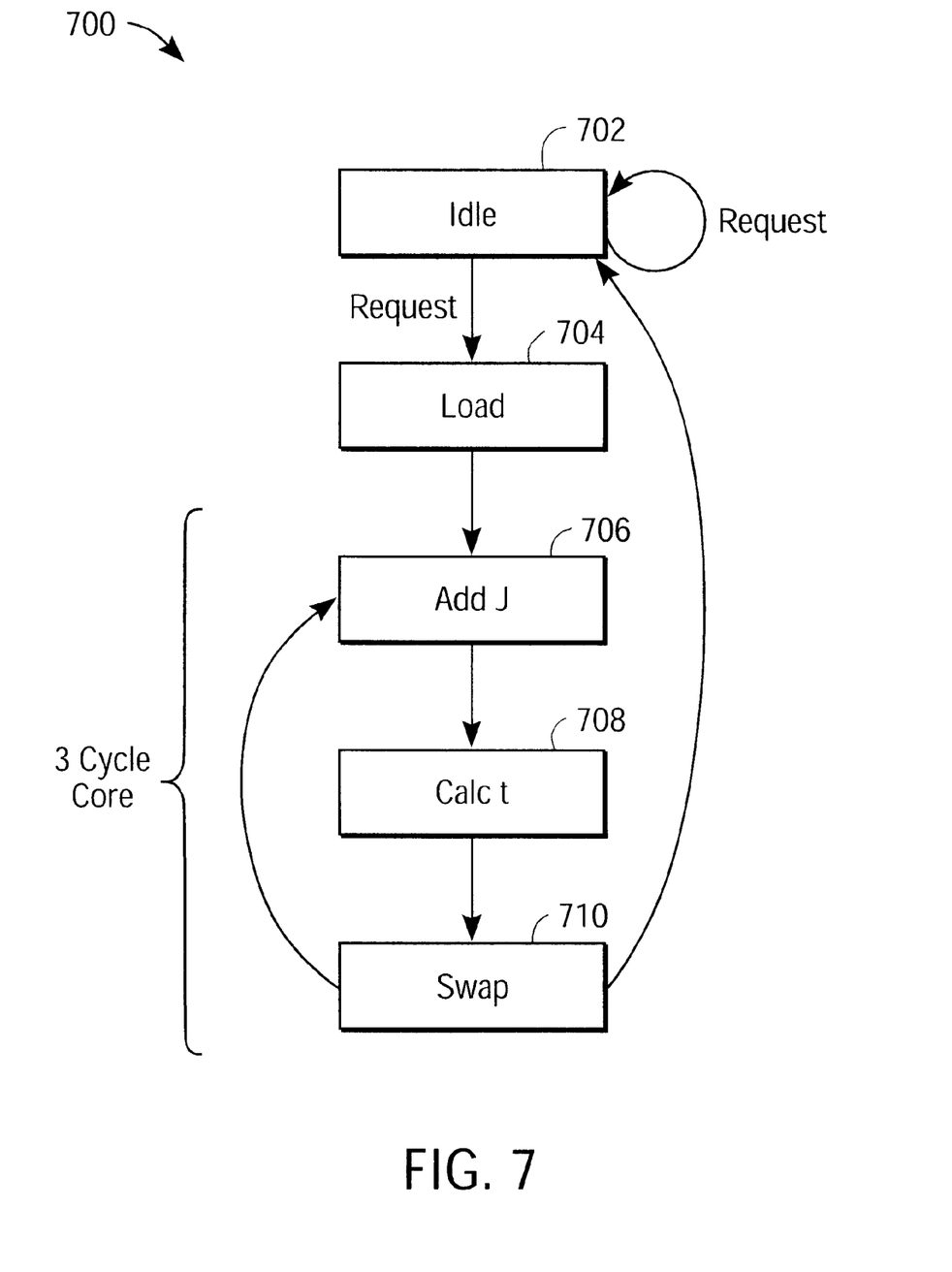
FIG. 7 is a flowchart illustrating the states of file encryption method in accordance with the present invention.
Figure 8A:
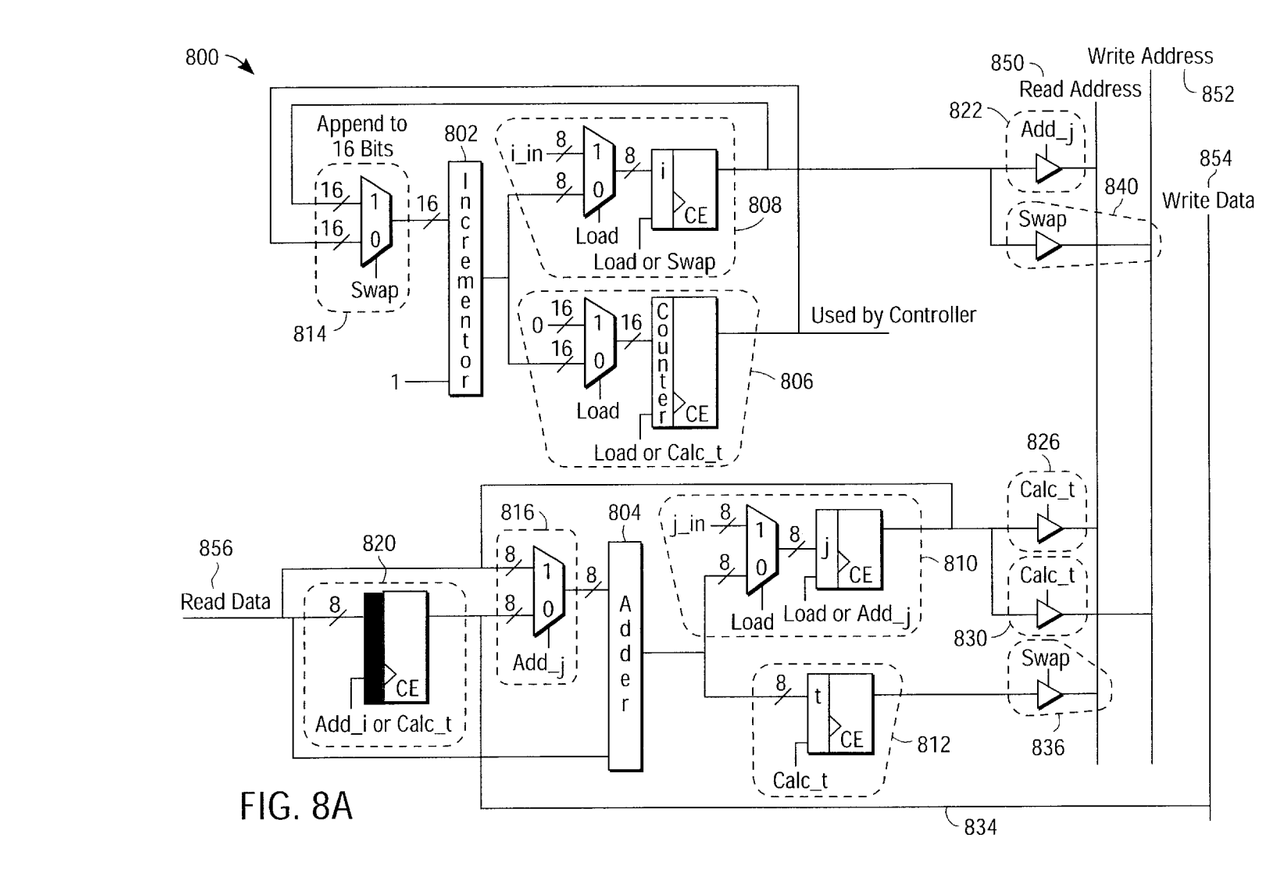
FIGS. 8A and 8B are block diagrams illustrating in detail the encryption circuit of FIG. 1.
Figure 8B:
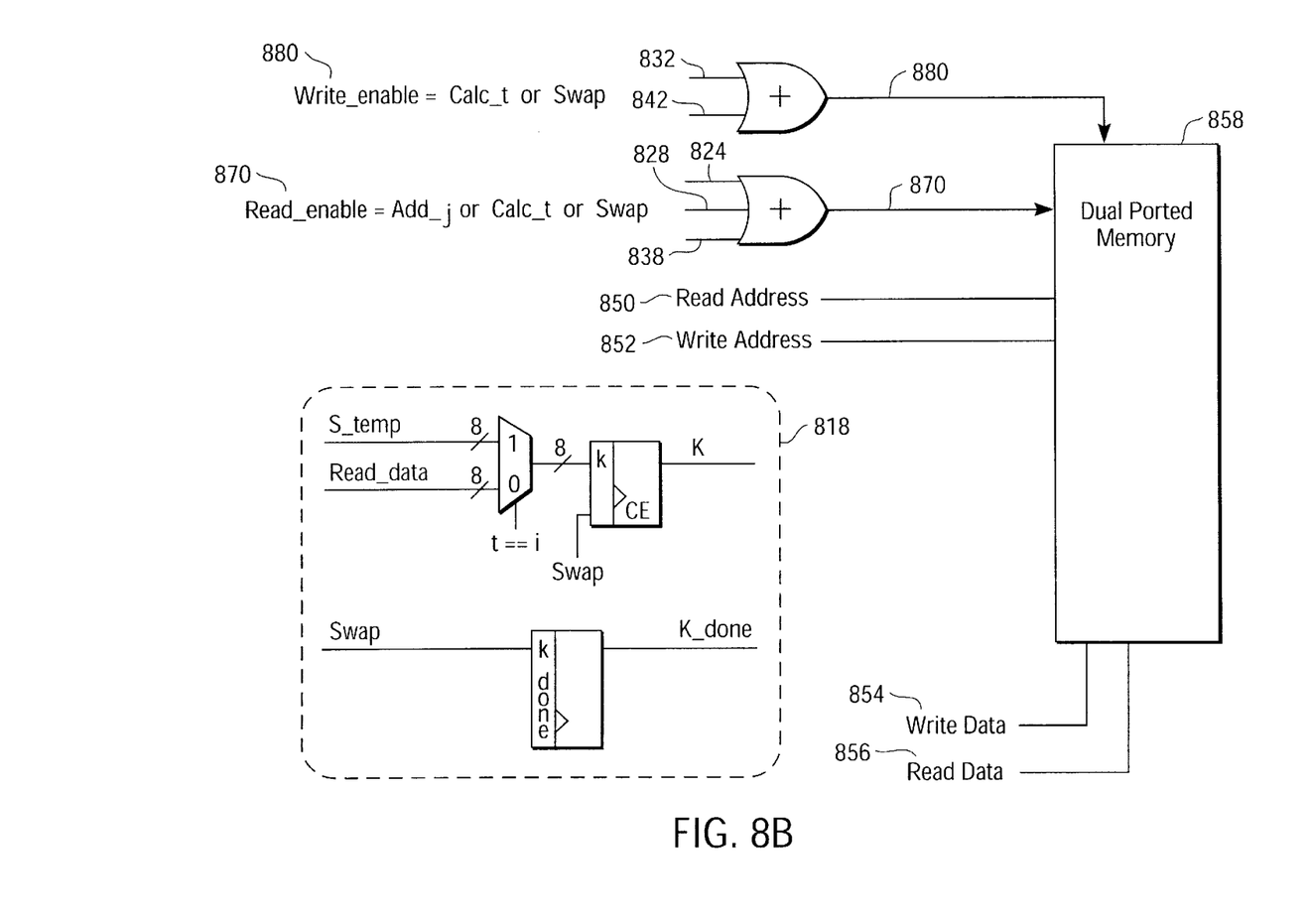

FIG. 7 is a flowchart illustrating the states of a state machine 700 for implementing the system of FIGS. 8A and 8B, which include a single dual port memory in accordance with the present invention. As shown, state machine 700 includes a three cycle core.

The state machine as shown includes five states that comprise states idle 702, load 704, add j 706, calc t 708, and swap 710. It will be appreciated that the module rc4_state-machine of the program of Table 5 includes each state of the state machine. One of ordinary skill in the art will understand the use of a "case statement" for providing the five states.

As shown, a request to encrypt or decrypt a message triggers the encryption/decryption algorithm to proceed from idle state 702 to load state 704. After performing the load state which includes an initial increment of "i", the encryption/decryption flow proceeds to the "add j" state 706, where $S_i$ is added to j. After completing the "add j" state", the flow proceeds to the "calc t" state 708 and takes the sum of $S_i$ and $S_j$ to calculate "t" and stores the value of $S_i$ into $S_j$. After calculating "t", the flow proceeds to swap state 710 to store $S_j$ into $S_i$ to swap the values of $S_i$ and $S_j$. The state "swap" 710 also increments "i". The key "k" acquires the value of $S_t$.

One of ordinary skill in the art will understand that the flowchart represents a five state machine. The last three states, "add j" 706, "calc t" 708 and "swap" 710 represent a three cycle core. It will be appreciated that the three cycle core will continue to loop until there are no additional message packets to encrypt or decrypt.

FIGS. 8A and 8B show in detail a diagram of the hardware implementation of the encryption/decryption method of Table 3. The hardware implementation of FIGS. 8A and 8B correspond to the "rc4_algorithm" of the simulation program of Table 5 and show in detail the hardware implementation of the encryption/decryption method of Table 3.

It will be appreciated that the hardware implementation of FIGS. 8A and 8B and the program of Table 4 utilize the same reference numerals to identify the specific code that corresponds to a portion of the hardware implementation. For example, incrementor 802 corresponds with the program code "assign incrementor_out=incrementor_in+16'b1." One of ordinary skill in the art will understand the correspondence between the program code and the hardware implementation of FIGS. 8A and 8B.

State machine 700 remains in idle state 702 until it receives a request. Upon receipt of a request, the method continues to load state 704. In load state 704, the MUXes of 808, and 810 each load with initial values, and the MUX of 806 loads with a value of zero. Therefore, in load state 704, the counter of 806 is reset to zero. The "i" register of 808 and the "j" register of 810 is respectively loaded with the "i" input and the "j" input. It will be appreciated that with this method if a portion of the process is completed, passing in the last "i" and "j" value allows for continued operations at a later point in the process.

In the "add j" state 706, "S temp" of 820 is enabled and the data read is input into S temp of 820. The MUX of 816 followed by the adder of 804 select the value to be added in the j register with the value in the s-temp register of 820.

In the next state, "calc t" state 708, MUX of 814 selects the counter selected to increment. MUX of 808 allows the new incrementor value to proceed through, but due to the clock enable of the "i" register of 808, this is not passed. The same occurs to the MUX and counter register of 806, with the exception that the counter of 806 is clock enabled. Therefore the incremented value will be loaded into the counter of 806. Neither tri-state buffers of 822 and 840 are activated by state "calc-t" 708. Read data is stored in the s-temp register of 820 because it is clock enabled by state calc-t 708. MUX of 816 selects the s-temp value that will be input for the adder of 804. There is no affect on the MUX of 810 because the "j" register of 810 is not enabled by the calc-t state 708. T register of 812 is enabled, so that the adder output is stored in the "t" register of 812. Also the tri-state buffers 826 and 830 enable the "j" register of 810 to output data to the read address and the write address during state calc-t 708.

In the next state, state swap 710, MUX of 814 selects the output of "i" register of 808 as input for incrementor 802. MUX of 806 is not in load, therefore the incrementor value is going to proceed, but only the "i" register is clock enabled. The "i" register output will continue through the tri-state buffer 840 to the write address. In the MUX of 816, since it is not state add "j", pass the s-temp output value for adding in adder 804. It will be appreciated that neither register of 812 or register of 810 is clock enabled. One of ordinary skill in the art will understand that s-temp of 820 is the staged value of what was in read data the previous cycle. In this case, adder 804 adds the two values that yield a result that is not used in this state. It will be appreciated that the read address is in the "t" register of 812. The address then continues to tri-state buffer 836. Then return to state "add j" 706 where this process continues.

Figure 9:
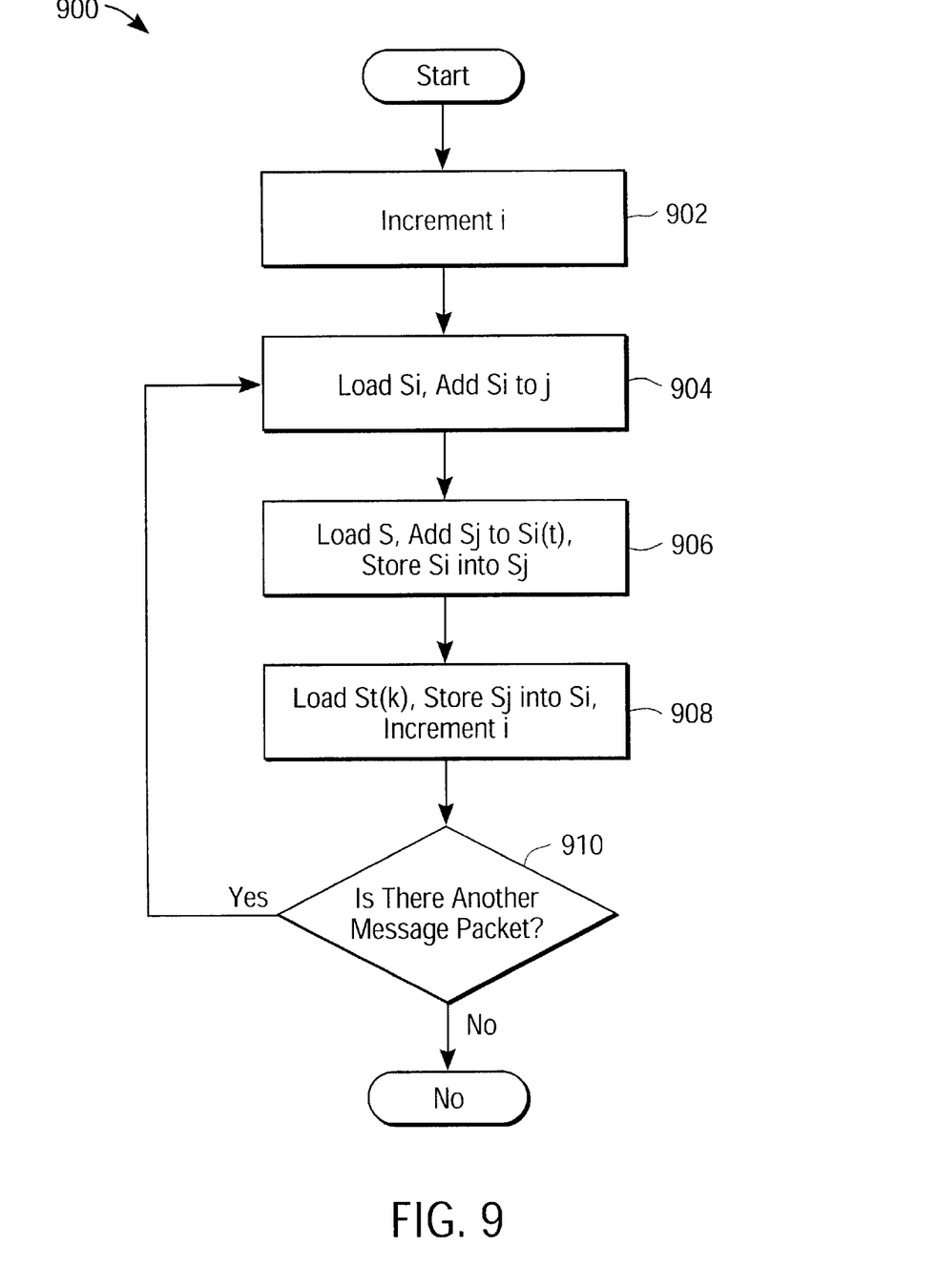
FIG. 9 is a flowchart illustrating a method of file encryption in accordance with the present invention.

FIG. 9 is a flowchart illustrating a method 900 of computing a key to encrypt a message according to the algorithm of Table 3 and to the states of FIG. 7. In step 902, increment the value of "i". In step 904, load $S_i$ and add $S_i$ to "j". In step 906, load $S_j$, add $S_j$ to $S_i$ to generate "t" and store $S_i$ into $S_j$. In step 908 load $S_j$(reading k), store $S_j$ into $S_i$ and increment the value of "i". In step 910, if there is an additional message packet then return to step 904 to encrypt the new message packet, else if there is not an additional message packet then end the encryption method.

It can therefore be appreciated that a new and novel file encryption and decryption system and method has been described. It will be appreciated by those skilled in the art that, given the teaching herein, numerous alternatives and equivalents will be seen to exist which incorporate the invention disclosed hereby. As a result, the invention is not to be limited by the foregoing exemplary embodiments, but only by the following claims.

What is claimed is:

1. A system for applying an RC4 cipher technique, comprising:
    a message receiver for receiving a message;
    a key computation module for computing a key according to the RC4 cipher technique, where the key computation module includes at least one multiport memory that allows for a synchronous read and write; and
    an XOR module coupled to the message receiver and to the key computation module for performing an XOR function of the message and the key to yield an encrypted message.

2. The system of claim 1, wherein the key computation module includes:
    a control logic module for receiving a request from the message receiver to encrypt the message.

3. The system of claim 2 further comprising an interface between each multiport memory and the control logic that includes a read data bus, read address bus, read control bus, write data bus, write address bus and write control bus.

4. The system of claim 1, wherein each multiport memory includes "s" values.

5. The system of claim 1, further including a communication engine coupled to the XOR module for sending the encrypted message.

6. The system of claim 1, wherein the XOR module performs an XOR function of the message and the key to yield a decrypted message.

7. The system of claim 1, wherein the system is included within a computer.

8. A system of claim 1, wherein the XOR module is configured to perform an XOR function of the message and the key to yield a decrypted message.

9. A method for applying an RC4 cipher technique using a circuit which includes at least one dual port memory, the method performed by the circuit to encrypt a message comprising the steps of:
    (a) incrementing a value "i";
    (b) loading a value $S_i$ from the at least one dual port memory allowing for synchronous read and write;
    (c) simultaneously with step (b) adding the value $S_i$ to a value "j";
    (d) loading a value $S_j$ from the at least one dual port memory;
    (e) simultaneously with step (d) adding the value $S_j$ to the value $S_i$ to generate a value "t" and storing the value $S_i$ into the value $S_j$;
    (f) reading a value "k" by loading a value $S_t$;
    (g) simultaneously with step (f) storing the value $S_j$ into the value $S_i$ and incrementing the value "i"; and
    (h) performing an XOR function of a portion of the message and the value "k" to encrypt the portion of the message.

10. The method of claim 8, wherein the method performed by the circuit decrypts a message, and wherein the step of performing an XOR function of the portion of the message and the value "k" decrypts the portion of the message.

11. A method for applying an RC4 cipher technique using a circuit which includes at least two dual port memories, the method performed by the circuit to encrypt a message comprising the steps of:
    (a) incrementing a value "i";
    (b) loading a value $S_i$ from at least one of the at least two dual port memories allowing for synchronous read and write;
    (c) simultaneously with step (b) adding the value $S_i$ to a value "j";
    (d) loading a value $S_j$ from at least one of the at least two dual port memories;
    (e) simultaneously with step (d) adding the value $S_j$ to a value $S_i$ to generate a value "t", storing the value of $S_i$ into the value $S_j$, and incrementing the value "i";
    (f) reading a value "k" by loading a value $S_t$ from a second of the at least two dual port memories,
    (g) simultaneously with step (f) loading the value $S_i$, adding the value $S_i$ to the value "j", storing the value $S_j$ of step (d) into the value $S_i$ of step (b); and
    (h) performing an XOR function of a portion of the message and the value "k" to encrypt the portion of the message.

12. The method of claim 11, wherein the method performed by the circuit decrypts a message, and wherein the step of performing an XOR function of the portion of the message and the value "k" decrypts the portion of the message.

13. A key computation module in a system for encryption or decryption according to the RC4 algorithm, comprising:
    a control logic coupled to receive a request for a key and to transmit the key, configured to compute the key according to the RC4 algorithm, wherein the control logic is configured to read s-values from an at least one multiport memory, calculate new s-values, and write the new s-values to the at least one multiport memory in a single cycle; and
    the at least one multiport memory coupled to the control logic, configured to read the s-values and write the new s-values in a single cycle.

14. A method of computing a key for encryption or decryption according to the RC4 algorithm, comprising the steps of:
    receiving a request for a key;
    computing a key according to the RC4 algorithm, the RC4 algorithm performed by reading s-values from an at least one multiport memory, calculating new s-values, and writing the new s-values to the at least one multiport memory in a single cycle; and
    transmitting the key.

15. A method for applying an RC4 cipher technique using a circuit which includes at least one dual port memory, the method performed by the circuit to encrypt a message comprising the steps of:
    (a) incrementing a value "i";
    (b) loading a value $S_i$ from the at least one dual port memory allowing for synchronous read and write;
    (c) simultaneously with step (b) adding the value $S_i$ to a value "j";
    (d) loading a value $S_j$ from the at least one dual port memory;
    (e) simultaneously with step (d) adding the value $S_j$ to the value $S_i$ to generate a value "t" and storing the value $S_i$ into the value $S_j$;
    (f) reading a value "k" by loading a value $S_t$;
    (g) simultaneously with step (f) storing the value $S_j$ into the value $S_i$ and incrementing the value "i"; and
    (h) performing an XOR function on the message and the value "k" to encrypt the message.

* * * * *